US012667738B2

(12) United States Patent
Garcia Risueño et al.

(10) Patent No.: US 12,667,738 B2
(45) Date of Patent: Jun. 30, 2026

(54) STERILE BODY SUIT APPARATUS, SYSTEM, AND METHOD

(71) Applicant: Production Club Inc., Los Angeles, CA (US)

(72) Inventors: Miguel Garcia Risueño, Los Angeles, CA (US); Hugo Bermudez Lopez, Seville (ES); Juan Civera Dominguez, Saragossa (ES); Francisco Zurita Bobis, Seville (ES); Corey Johnson, Los Angeles, CA (US); Vivek Srinivasan, Los Angeles, CA (US); Natalia de la Parra Ferreiro, Los Angeles, CA (US); Kyle McCarthy, Los Angeles, CA (US)

( * ) Notice: Subject to any disclaimer, the term of this patent is extended or adjusted under 35 U.S.C. 154(b) by 1279 days.

(21) Appl. No.: 17/239,213

(22) Filed: Apr. 23, 2021

(65) Prior Publication Data

US 2021/0330999 A1 Oct. 28, 2021

Related U.S. Application Data

(60) Provisional application No. 63/015,154, filed on Apr. 24, 2020.

(51) Int. Cl.
A62B 17/00 (2006.01)
A41D 13/002 (2006.01)
(Continued)

(52) U.S. Cl.
CPC .......... A62B 17/006 (2013.01); A41D 13/002 (2013.01); A42B 3/30 (2013.01);
(Continued)

(58) Field of Classification Search
CPC .......... A62B 17/006; A62B 7/10; A62B 9/00; A62B 9/003; A62B 17/003; A62B 17/005;
(Continued)

(56) References Cited

U.S. PATENT DOCUMENTS

| | | | | |
|---|---|---|---|---|
| 3,067,425 A | * | 12/1962 | Colley ................. | A62B 18/086 |
| | | | | 137/614.19 |
| 4,783,853 A | | 11/1988 | Zuber | |
| 5,839,432 A | * | 11/1998 | Daneshvar ............... | A42C 5/04 |
| | | | | 2/205 |
| 8,708,708 B1 | * | 4/2014 | Carideo ................ | G01M 3/227 |
| | | | | 73/40 |
| 9,211,069 B2 | | 12/2015 | Larsen et al. | |
| 2004/0226558 A1 | * | 11/2004 | Kausch ................ | A62B 17/005 |
| | | | | 128/201.29 |

(Continued)

FOREIGN PATENT DOCUMENTS

CN 1513392 A * 7/2004

OTHER PUBLICATIONS

English translation for CN 1513392, machine translated by espacenet. com, translated on Mar. 6, 2025.*

*Primary Examiner* — Tu A Vo

(57) ABSTRACT

A sterile body suit apparatus, system, and method is provided. In certain embodiments, the sterile body suit apparatus includes a helmet member, an upper extremity member, and control interface as well as means components for respiration, ingestion and audio communication. The upper extremity may be defined by a torso, a first arm, and a second arm, and an egestion component. In some embodiments, the sterile body suit may further include components for temperature control and tactile sensation. A method for use may include: providing one or more mobile computing devices; providing one or more body suits at an environment having a local computing device; and, at the one or more mobile computing devices, a suit selection, generating and transmitting-a suit selection notification, and receiving-the suit selection notification; and preparing and delivering, at the environment, the one or more body suits to one or more wearers.

6 Claims, 11 Drawing Sheets

(51) Int. Cl.

| | |
|---|---|
| *A42B 3/30* | (2006.01) |
| *A62B 7/10* | (2006.01) |
| *A62B 9/00* | (2006.01) |
| *A62B 18/04* | (2006.01) |
| *A62B 18/08* | (2006.01) |
| *A62B 25/00* | (2006.01) |
| *G06F 3/16* | (2006.01) |

(52) U.S. Cl.

CPC .................. *A62B 7/10* (2013.01); *A62B 9/00* (2013.01); *A62B 9/003* (2013.01); *A62B 17/003* (2013.01); *A62B 17/005* (2013.01); *A62B 18/04* (2013.01); *A62B 18/08* (2013.01); *A62B 18/086* (2013.01); *A62B 25/00* (2013.01); *G06F 3/16* (2013.01)

(58) Field of Classification Search

CPC ...... A62B 18/04; A62B 18/08; A41D 13/002; A42B 3/30

See application file for complete search history.

(56) References Cited

U.S. PATENT DOCUMENTS

| | | | | |
|---|---|---|---|---|
| 2004/0237178 A1* | 12/2004 | Landeros | ............... | A62B 17/00 |
| | | | | 2/457 |
| 2007/0095344 A1* | 5/2007 | Abernethy | ........... | A62B 17/006 |
| | | | | 128/201.22 |
| 2007/0283961 A1* | 12/2007 | Hsieh | ................... | A62B 17/006 |
| | | | | 128/205.27 |
| 2008/0238093 A1* | 10/2008 | Harvie | ................ | A62B 17/006 |
| | | | | 285/305 |
| 2013/0091624 A1* | 4/2013 | Czajka | ............... | A41D 13/1209 |
| | | | | 2/456 |
| 2017/0296848 A1* | 10/2017 | Lawson | ............... | A62B 17/006 |
| 2018/0108236 A1* | 4/2018 | Kanukurthy | ......... | G06Q 50/265 |
| 2018/0214720 A1* | 8/2018 | Gooi | ..................... | A41D 31/04 |
| 2019/0082267 A1 | 3/2019 | Alexiou et al. | | |
| 2020/0046040 A1* | 2/2020 | Kanukurthy | ........... | A62B 17/00 |
| 2020/0306567 A1* | 10/2020 | Wallace | ............... | A62B 18/025 |
| 2021/0289854 A1* | 9/2021 | Popa-Simil | .......... | A62B 17/006 |

* cited by examiner

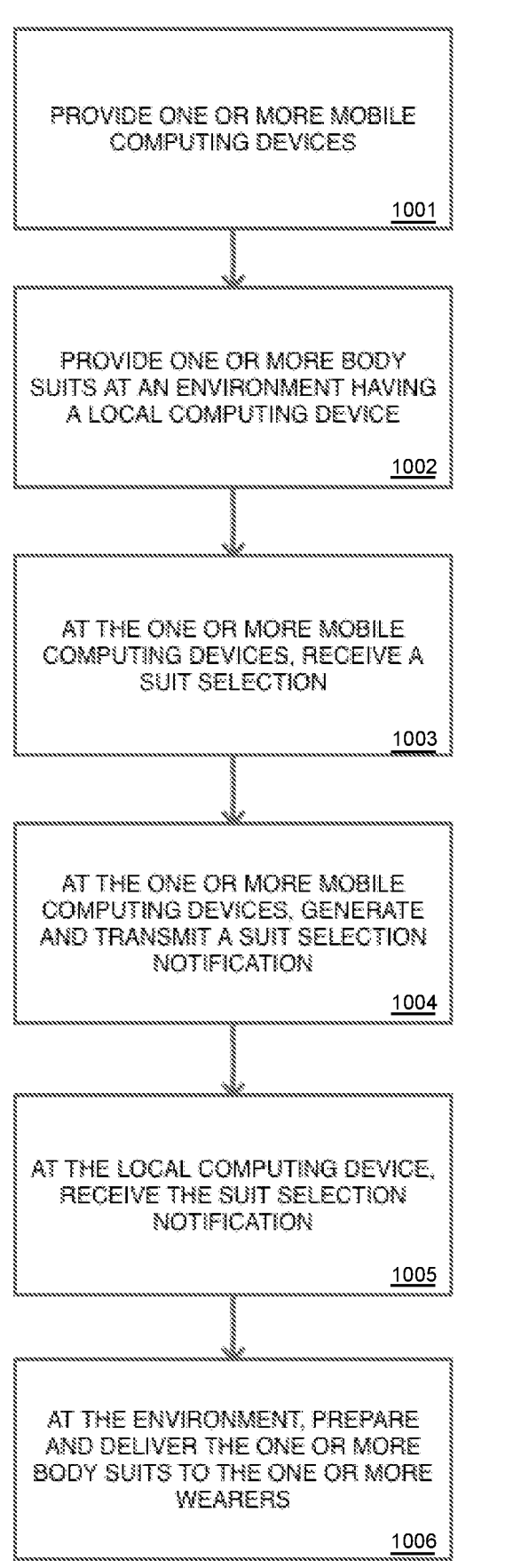

PROVIDE ONE OR MORE MOBILE
COMPUTING DEVICES

1001

PROVIDE ONE OR MORE BODY
SUITS AT AN ENVIRONMENT HAVING
A LOCAL COMPUTING DEVICE

1002

AT THE ONE OR MORE MOBILE
COMPUTING DEVICES, RECEIVE A
SUIT SELECTION

1003

AT THE ONE OR MORE MOBILE
COMPUTING DEVICES, GENERATE
AND TRANSMIT A SUIT SELECTION
NOTIFICATION

1004

AT THE LOCAL COMPUTING DEVICE,
RECEIVE THE SUIT SELECTION
NOTIFICATION

1005

AT THE ENVIRONMENT, PREPARE
AND DELIVER THE ONE OR MORE
BODY SUITS TO THE ONE OR MORE
WEARERS

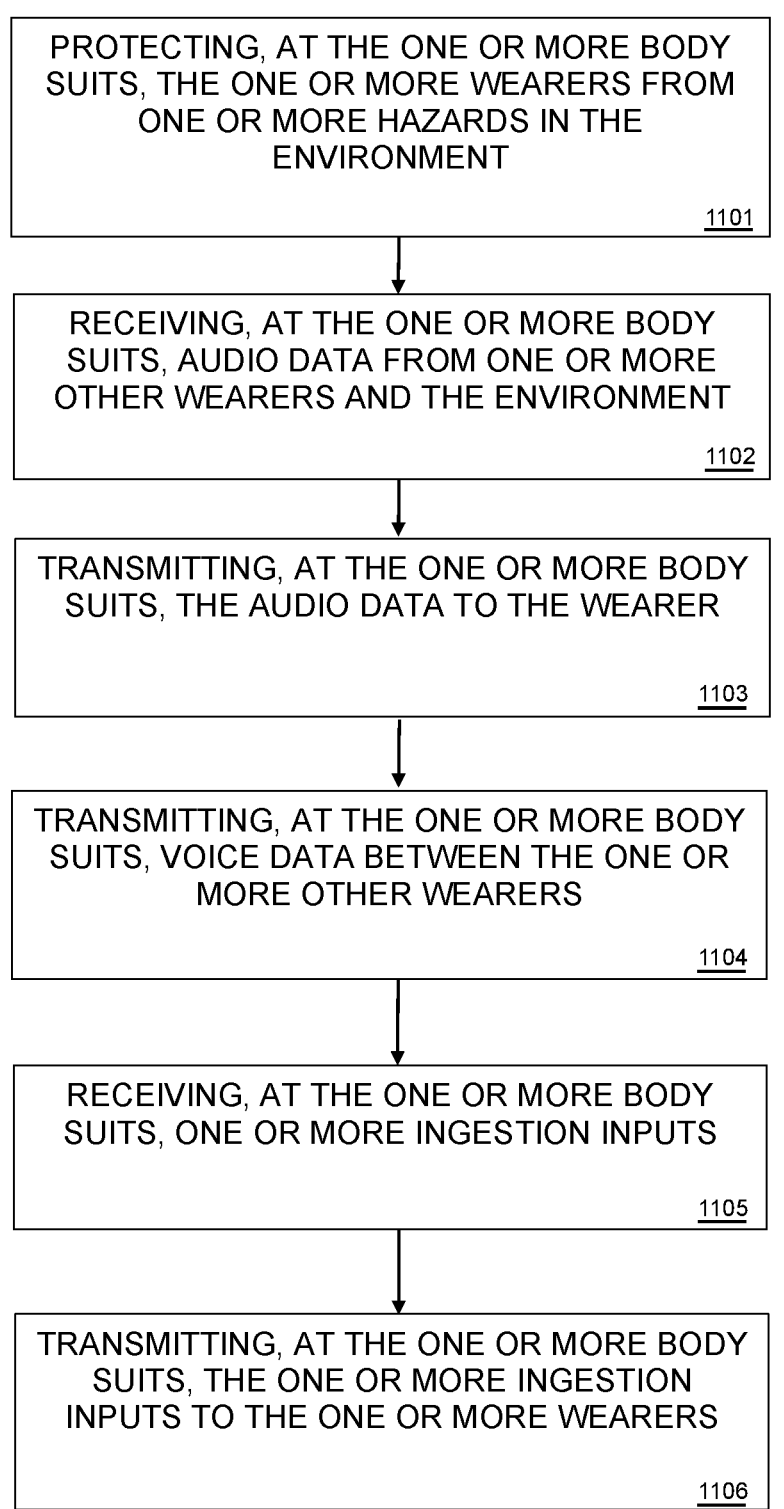

PROTECTING, AT THE ONE OR MORE BODY
SUITS, THE ONE OR MORE WEARERS FROM
ONE OR MORE HAZARDS IN THE
ENVIRONMENT

1101

RECEIVING, AT THE ONE OR MORE BODY
SUITS, AUDIO DATA FROM ONE OR MORE
OTHER WEARERS AND THE ENVIRONMENT

1102

TRANSMITTING, AT THE ONE OR MORE BODY
SUITS, THE AUDIO DATA TO THE WEARER

1103

TRANSMITTING, AT THE ONE OR MORE BODY
SUITS, VOICE DATA BETWEEN THE ONE OR
MORE OTHER WEARERS

1104

RECEIVING, AT THE ONE OR MORE BODY
SUITS, ONE OR MORE INGESTION INPUTS

1105

TRANSMITTING, AT THE ONE OR MORE BODY
SUITS, THE ONE OR MORE INGESTION
INPUTS TO THE ONE OR MORE WEARERS

STERILE BODY SUIT APPARATUS, SYSTEM, AND METHOD

CROSS-REFERENCE TO RELATED APPLICATIONS

Pursuant to 35 U.S.C. § 120, this Patent Application relies on the benefit of U.S. patent application Ser. No. 63/015,154 filed on Apr. 24, 2020. The content of said application is incorporated herein by reference in its entirety.

GOVERNMENT CONTRACT

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to sterile body suit apparatuses, systems, and methods and, more particularly, to sterile body suits, systems, and methods which avoid the possible spread of airborne contagions while allowing individual wearers thereof to connect and participate in group gatherings in person.

BACKGROUND

Recently, coronavirus disease (COVID-19), an infectious disease caused by the newly discovered coronavirus, has extended across the globe creating an international pandemic. COVID-19 primarily spreads through droplets of saliva or discharge from the nose when an infected individual coughs, sneezes, or even, exhales. While most who become infected with COVID-19 only experience mild to moderate respiratory illness, there exists a significant number of high-risk individuals within our society that are more likely to develop serious illness and even, death.

Researchers and experts work tirelessly to prevent and treat the coronavirus disease and other airborne contagions. Meanwhile, a number of guidelines and mitigating steps have been taken to reduce its spread. Such measures have changed the manner in which people perform their everyday tasks. For instance, as should always be the case, individuals are encouraged to religiously wash their hands, as well as practice proper coughing and sneezing etiquette (i.e., into a flexed elbow). Furthermore, vaccines have been developed to but of course, do not ensure absolute prevention of infection.

More severely, social distancing, or physical distancing, has been implemented to maintain space between individuals, thereby reducing the amount with which people come into close contact with one another. Social distancing measures have been introduced as a way of slowing down the spread of the disease. However, despite technological advances, there are certain drawbacks that make it unsustainable for an extended period of time. Indeed, social distancing takes a toll on mental health, as well as, the economy. Moreover, individuals desire in-person, physical connection with others.

To allow individuals to gather in group settings, individuals have been instructed to wear gloves (whether medical grade or not) and other face coverings to guard their respiratory system from airborne contagions. However, these measures are not completely effective and should be used sparingly and only when an individual must gather with others. Personal protective equipment (known as "PPE") is equipment worn to minimize exposure to hazards that cause serious injuries or illnesses resulting from contact with any number of potential chemical or physical hazards. As it relates to biological hazards, such as airborne contagions, PPE in the form of protective clothing is often needed for guarding against infection.

PPE is often bulky, expensive, and inconvenient. Moreover, most PPE has not been commercialized to non-official settings and is therefore, not widely available. Thus, there remains a need for a sterile body suit that eliminates or reduces the possibility of spreading airborne contagions, while allowing for in-person social connection. Indeed, there remains a need for a solution that allows people to safely interact in close proximity. In addition, there remains a need for easy-to-control, safe-to-clean, and fast-to-deploy PPE that allows socializing without physical distancing.

SUMMARY

The present disclosure is directed to sterile body suit apparatuses, systems, and methods that reduce and, in some embodiments, eliminate the possibility of spreading airborne contagions, such as viruses. More particularly, the sterile body suit may provide an airtight, sterile and, sometimes, waterproof, personal environment for a wearer thereof. The wearer of the sterile body suit may therefore be able to participate in social gatherings with multiple individuals, such as at nightclubs, restaurants, bars, theaters, concerts, and other group events, activities, or outings without increasing their risk of exposure to potential contagions. In certain embodiments, the wearer may be able to drink, eat, vape or smoke while wearing the sterile body suit. The body suit may be designed so as to flatter the wearer's body, as well as, provide for comfortable movement, such as dancing. Further, the body suit may also be designed so as to follow current fashion trends.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, the sterile body suit may comprise a helmet member, an upper extremity member, a control interface means, and a power supply. The helmet member may be defined by an interior cavity, which may correspond to the size and shape of the wearer's head. The helmet may further comprise a respiratory means to provide uncontaminated, breathable air to the wearer, an ingestion means for drinking, eating, and vaping, and an audio communication means. The upper extremity member may be defined by a torso, a first arm, and a second arm. In further embodiments, the sterile body suit may also comprise a temperature control means and/or a tactile sensation means. In these embodiments, because the sterile body suit may not secure to or protect the wearer's lower body, the wearer may be able to wear/display any garment and/or footwear of their choosing, use to restroom, and engage in sexual intercourse with other wearers while avoiding risk of exposure to respiratory contagions.

In some embodiments, the helmet member and the upper extremity member may comprise a single-bodied sterile body suit apparatus. In such embodiments, the helmet member may be contiguously joined to the upper extremity member. In alternate embodiments, the helmet member may be separate but securable to the upper extremity member. Indeed, the helmet member may secure to the upper extremity member so as to form an airtight seal disallowing entrance of contagions, toxins, or other hazards within an interior cavity of the body suit. In further embodiments, the sterile body suit may be adjustable to fit the size and shape of the wearer. In these embodiments, the sterile body suit may comprise one or more adjustable straps. In other embodiments, the sterile body suit may be one-size-fits-all.

The helmet member may be defined by a face portion and a head portion. Either or both of the face portion and the head portion may be formed of rigid or soft material. In some embodiments, the face portion and/or the head portion may comprise a light source to illuminate the face or the head of the wearer. Moreover, the face portion may be transparent and therefore, may comprise a transparent material, such as plastic or glass. The face portion may further comprise the respiratory means located at or near a nose or a mouth of the face portion along an interior surface thereof. The respiratory means may allow the wearer to breath and may further provide purified, sterilized air to the wearer.

According to certain exemplary embodiments, the helmet member may further comprise the ingestion means for drinking, eating, and vaping. The ingestion means may be disposed along the face portion of the helmet member and may comprise one or more canisters through which a beverage, a food item, or vapor, as the case may be, may pass to the wearer. The ingestion means may allow the wearer to drink, eat, and vape while maintaining an airtight, sterile personal environment within the interior cavity of the body suit. In some embodiments, the canisters may be partially disposable. Further, the one or more canisters may comprise an identification means, such as a barcode, product code, iconography, or other identification system to allow the wearer to accurately identify the contents thereof.

In further embodiments, the face portion may further comprise one or more cameras disposed along an exterior surface thereof. The one or more cameras may be angled downward and may capture real-time video footage, so as to provide visibility to the wearer where the body suit may otherwise occlude vision, such as while using restroom facilities. The one or more cameras may also use artificial intelligence to analyze the real-time video footage and generate a perceived threat level. In this manner, the one or more cameras or the control interface means may generate and transmit an emergency notification to an appropriate authority or entity. Moreover, the one or more cameras may capture photographs and video footage to be stored locally or through cloud storage or other storage means.

The audio communication means may comprise one or more speakers and one or more microphones. In addition, the audio communication means may be operative to receive and transmit audio data using a variety of means. In certain embodiments, the audio communication means may receive and transmit audio data over Bluetooth, a local area network (LAN), such as WiFi, cellular, radio-frequency identification (RFID), near-field communication (NFC) links, infrared, a radio, a global positioning system (GPS) combined with LAN or a wireless access network (WAN), or a mesh network. The audio communication means may receive and transmit audio data using other means known to those skilled in the art. The audio communication means may allow the wearer to socialize, listen to music, or listen to or communicate other auditory inputs.

The first arm of the upper extremity member may comprise a first hand and the second arm may comprise a second hand. Each of the first and second hands may provide sufficient dexterity to allow the wearer to gesture, interact with the control interface means, grasp and hold items, and show physical affection to others. In addition, each of the first and second hands, or one or more fingertips thereof, may provide non-slip grip. In certain embodiments, the first and second hands may be formed of a material that allows the wearer to interact with a touchscreen device. For instance, the first and second hands may be formed of conductive threads, such as silver or copper. Moreover, the first and second hands may comprise one or more latches such as magnetic pull latches, for sealed securability to the upper extremity member and easy removal.

The control interface means may be operative to control all aspects of the personal environment within the interior cavity of the body suit. For example, the control interface means may be operative to selectively receive audio data from the environment, such as music played by a disc jockey (DJ) or conversation with friends or strangers. The control interface means may also be operative to adjust the volume within the interior cavity. Similarly, the control interface means may be operative to adjust whether and when audio data is received within the interior cavity. Further, the control interface means may transmit a beverage notification or a food notification to the environment's staff/personnel, indicating the wearer desires a corresponding beverage or food item. Importantly, the control interface means may also transmit an emergency notification to a remote operator, the environment's staff, or even local law enforcement. In embodiments where the control interface means may transmit the emergency notification to the remote operator, the remote operator may then provide troubleshooting instructions or other assistance.

In certain embodiments, the control interface means may comprise a mobile computing device. The mobile computing device may be associated with the wearer or may be associated with an environment within which the wearer is socially gathering. In such embodiments, the mobile computing device may be secured to a portion of the body suit. For instance, the mobile computing device may be secured to a wrist of the first or second arm.

In alternate embodiments, the control interface means may comprise a body suit interface device disposable along one or more of the helmet member, the upper extremity member, or a lower extremity member. In embodiments where the body interface device is disposed along the interior surface of the helmet, the body suit interface device may comprise an auditory interface, such as through an intelligent assistant, or a visual interface. In embodiments where the body suit interface device is disposed along the upper extremity member or the lower extremity member, the body suit interface device may comprise an intelligent watch, a tablet device, or a smartphone device. In some of these embodiments, the body suit interface device may be foldable or otherwise storable along the upper extremity member or the lower extremity member.

The sterile body suit may further comprise the temperature control means. The temperature control means may regulate the temperature within the interior cavity of the body suit so as to keep the wearer comfortable therein. The temperature control means may comprise one or more vents, or a ventilation system, to circulate air within the interior cavity and evaporate the wearer's sweat. The one or more vents may comprise air-purifying filters so as to avoid contamination of the interior cavity. In other embodiments, the temperature control means may comprise a cooling undergarment, such as a shirt, vest, or underwear. The cooling garment may comprise a plurality of tubes through which chilled water or air flows, thereby removing excess heat from the wearer's body directly.

In some embodiments, the sterile body suit may further comprise the tactile sensation means so as to allow the wearer to sense touch and pressure applied to the body suit. The tactile sensation means may comprise haptic feedback, such as through a plurality of electrically oscillating motors within the body suit, electromuscular stimulation, or transcutaneous electrical neural stimulation. Additionally, the sterile body suit may comprise a tactile audio system using haptic feedback through sensors on the wearer's skin, interoception through subtle changes in force and pressure, and bone conduction through vibrations pulsed through bones. In alternate embodiments, the sterile body suit itself may be partially or wholly formed of a thin material so as to allow the wearer to actually sense touch and pressure applied to the body suit. The tactile sensation means may further cause the wearer to experience physical connection with other individuals.

According to further embodiments, the sterile body suit may further comprise the lower extremity member, which may be defined by a first leg and a second leg. The lower extremity member may be contiguously joined to the upper extremity member. Alternatively, the lower extremity member may be separate but securable to the upper extremity member and, in some embodiments, the lower extremity member may secure to the upper extremity member so as to form an airtight seal. The lower extremity member may also comprise an egestion means. The egestion means may be operative to remove one or more egestion outputs, such as bodily waste, from the wearer. In some embodiments, the egestion means may comprise a space toilet or one or more components thereof, such as a liquid/solid waste tube and a liquid/solid waste chamber.

In some embodiments, the sterile body suit may comprise one or more design elements, which may further comprise one or more dynamic design elements. For instance, the one or more design elements may comprise a flange, a stripe, a line, or a pattern disposed along the exterior surface of the body suit. The one or more design elements may vary between body suits or may be identical to all body suits and may be customizable. In this way, the one or more design elements may also comprise one or more attachment features, such as patches, hook-and-loop fasteners, magnets, hooks, adhesive, or other attachment means. Moreover, as another example, the one or more dynamic design elements may comprise one or more LED neon flex strips, RGB LED strips, or chemiluminescence devices. The one or more dynamic design elements may be dimmable. Further, the one or more dynamic design elements may indicate the wearer's emotion, needs (such as thirst and in need of a fresh beverage), or sexual availability.

In accordance with further embodiments, the sterile body suit system may comprise one or more sterile body suits and one or more mobile computing devices. The one or more body suits may comprise the sterile body suit described above or other types of body suits known to those skilled in the art. In certain embodiments, the system may further comprise one or more housing pods.

The one or more sterile body suits may be operative to protect a wearer from one or more hazards in a real-world environment. The one or more hazards may comprise one or more biological agents, one or more chemical agents, one or more nuclear agents, or one or more high temperature/fire agents. In embodiments where the one or more hazards may comprise the one or more biological agents, the one or more biological agents may comprise a virus, a bacteria, or any other contagion, airborne or otherwise. For example, the one or more biological agents may comprise the novel coronavirus.

The one or more sterile body suits may be further operative to provide a respiratory means. The respiratory means may provide uncontaminated, breathable air to the wearer and may comprise any known respiratory means, such as a respirator or a self-contained breathing apparatus. In further embodiments, the respiratory means may comprise an N99 particulate filter and suction system and an air ejection system. In alternate embodiments, the respiratory means may comprise other types of air filtration and breathing systems, such as N95, FFP2, KN95, P2, and DS FFR filters.

The one or more sterile body suits may also be operative to receive audio data from one or more other wearers and the environment and transmit the audio data to the wearer. In some embodiments, the environment may comprise a nightclub, a restaurant, a bar, a theater, an arena, or other social gathering location. For example, in embodiments where the environment may comprise the nightclub, the nightclub may provide entertainment in the form of DJ or other musical entity. In such embodiments, the audio data may comprise such resultant music.

Similarly, the one or more body suits may be operative to transmit voice data from the wearer to the one or more other wearers. In certain embodiments, the wearer may selectively transmit the voice data. In other embodiments, the voice data may be automatically transmitted responsive to the wearer being physically proximal to the one or more other wearers. In this manner, in order to receive and transmit the audio data and the voice data, the one or more body suits may implement LAN, Bluetooth in a low-range, GPS tracking combined with LAN or WAN, a radio, a node-based network, or other audio communication means. Moreover, in some embodiments, the one or more body suits may be operative to implement near-field communication (NFC) to determine whether and when to transmit voice data.

In certain embodiments, the one or more body suits may also be operative to receive one or more ingestion inputs and transmit the one or more ingestion inputs to the wearer. The one or more ingestion inputs may comprise a beverage, a food item, and vapor (from vaping). Finally, the one or more computing devices may be operative to receive a suit selection from the wearer and generate and transmit a suit selection notification to the environment. In this way, the environment may prepare for the wearer's arrival, such as by sterilizing the one or more body suits.

In further embodiments, the one or more mobile computing devices may be operative to control one or more functionalities of the one or more body suits. The one or more functionalities may comprise temperature regulation within an interior cavity of the one or more body suits. In these embodiments, the one or more body suits may be further operative to ventilate and purify air within the interior cavity. The one or more functionalities may also comprise volume regulation of the audio data, such as that received from the one or more other wearers or the environment. In some embodiments, the wearer may reduce or remove noise altogether within the interior cavity. The one or more functionalities may further comprise one or more ingestion input regulation, such as if the wearer desires the one or more ingestion inputs, and one or more design elements customization. The one or more body suits may comprise one or more design elements, such as LED strips, chemiluminescence devices, fabric patches, or other ornamental or personal elements. In certain embodiments, the one or more design elements may be one or more dynamic design elements in that the design elements may be dynamically customized in real-time by the wearer.

The sterile body suit system may further comprise one or more housing pods. The one or more housing pods may be operative to house the one or more sterile body suits. In this manner, the one or more housing pods may be associated with the one or more body suits in that each housing pod may house one sterile body suit. Alternatively, the one or more housing pods may each house multiple body suits. The one or more housing pods may also be operative to sterilize the one or more body suits, such as through ultraviolet (UV) sterilization, chemical sterilization, or other sterilization means. Further, the one or more housing pods may be operative to receive the suit selection notification from the mobile computing device and deliver the one or more body suits to the wearer. In some embodiments, the one or more housing pods may deliver the one or more body suits to the wearer by granting the wearer access to the one or more body suits. In other embodiments, the one or more housing pods may deliver the one or more body suits to the wearer by physically administering the body suit to the wearer.

According to some embodiments, the one or more sterile body suits may be further operative to evacuate one or more egestion outputs from the wearer. The one or more egestion outputs may comprise outputs associated with urination, defecation, and regurgitation. In certain embodiments, the one or more egestion outputs may be evacuated via a space toilet or one or more components thereof, such as a liquid/solid waste tube and a liquid/solid waste chamber.

Further, the one or more sterile body suits may be operative to provide tactile sensation to the wearer. Thus, the one or more sterile body suits may allow the wearer to sense touch and pressure applied to the suit and therefore, feel realistically immersed in the environment. More particularly, the one or more body suits may be operative to provide tactile sensation in the form of haptic feedback, electromuscular stimulation, or transcutaneous electrical neural stimulation.

In one embodiment of the present invention, a method involving the aforementioned sterile body suit or one or more sterile body suits may be used to allow for in-person, social gatherings while avoiding the risk of individual contamination. The method may comprise the steps of: providing one or more mobile computing devices; providing one or more body suits at an environment having a local computing device; receiving, at the one or more mobile computing devices, a suit selection; generating and transmitting, at the one or more mobile computing devices, a suit selection notification; receiving, at the local computing device, the suit selection notification; and preparing and delivering, at the environment, the one or more body suits to one or more wearers.

A further embodiment of the method may comprise the steps of: protecting, at the one or more body suits, the one or more wearers from one or more hazards in the environment; receiving, at the one or more body suits, audio data from one or more other wearers and the environment; transmitting, at the one or more body suits, the audio data to the wearer; transmitting, at the one or more body suits, voice data between the one or more other wearers; receiving, at the one or more body suits, one or more ingestion inputs; and transmitting, at the one or more body suits, the one or more ingestion inputs to the one or more wearers.

Finally, the sterile body suit method may further comprise the steps of: providing one or more housing pods at the environment, the one or more housing pods associated with the one or more body suits; receiving, at the one or more housing pods, the suit selection notification; and preparing and delivering, at the one or more housing pods, the one or more body suits. Moreover, preparing and delivering the one or more body suits may further comprise sterilizing the one or more body suits and the wearer.

One or more of the above-disclosed embodiments, in addition to certain alternatives, are provided in further detail below with reference to the attached figures. The disclosed subject matter is not, however, limited to any particular embodiment disclosed.

OBJECTS AND ADVANTAGES

Several objects and advantages of one or more aspects are to provide a sterile body suit apparatus, system, and method that:

(a) reduce or eliminate potential spread of airborne contagions, such as the coronavirus;

(b) increase sterilization and health of individuals gathering in a group environment;

(c) decrease the rate at which a contagion spreads within a community, society, or population;

(d) allow for in-person socialization during periods of quarantine or social distancing due to a pandemic;

(e) provide the ability for eating, drinking, and vaping while avoiding ingesting external hazards, such as an airborne contagion;

(f) relax the requirement for social distancing; and (g) reduce individual's experience of isolation, loneliness, and depression.

These and other advantages of one or more aspects will become apparent from consideration of the ensuing description and accompanying examples. Although the description above contains many specifics, these should not be construed as limiting the scope of the embodiments but as merely providing illustrations of some of several embodiments. Thus, the scope of the embodiments should be determined by the claims that are appended and their legal equivalents, rather than by examples given.

The description of the invention which follows, together with the accompanying examples should not be construed as limiting the invention to the examples shown and described, because those skilled in the art to which this invention pertains will be able to devise other forms thereof within the ambit of the appended claims.

BRIEF DESCRIPTION OF THE DRAWINGS

FIG. 10 is a flowchart depicting an exemplary sterile body suit method.

FIG. 11 is a flowchart depicting an exemplary sterile body suit method.

Figure 1:
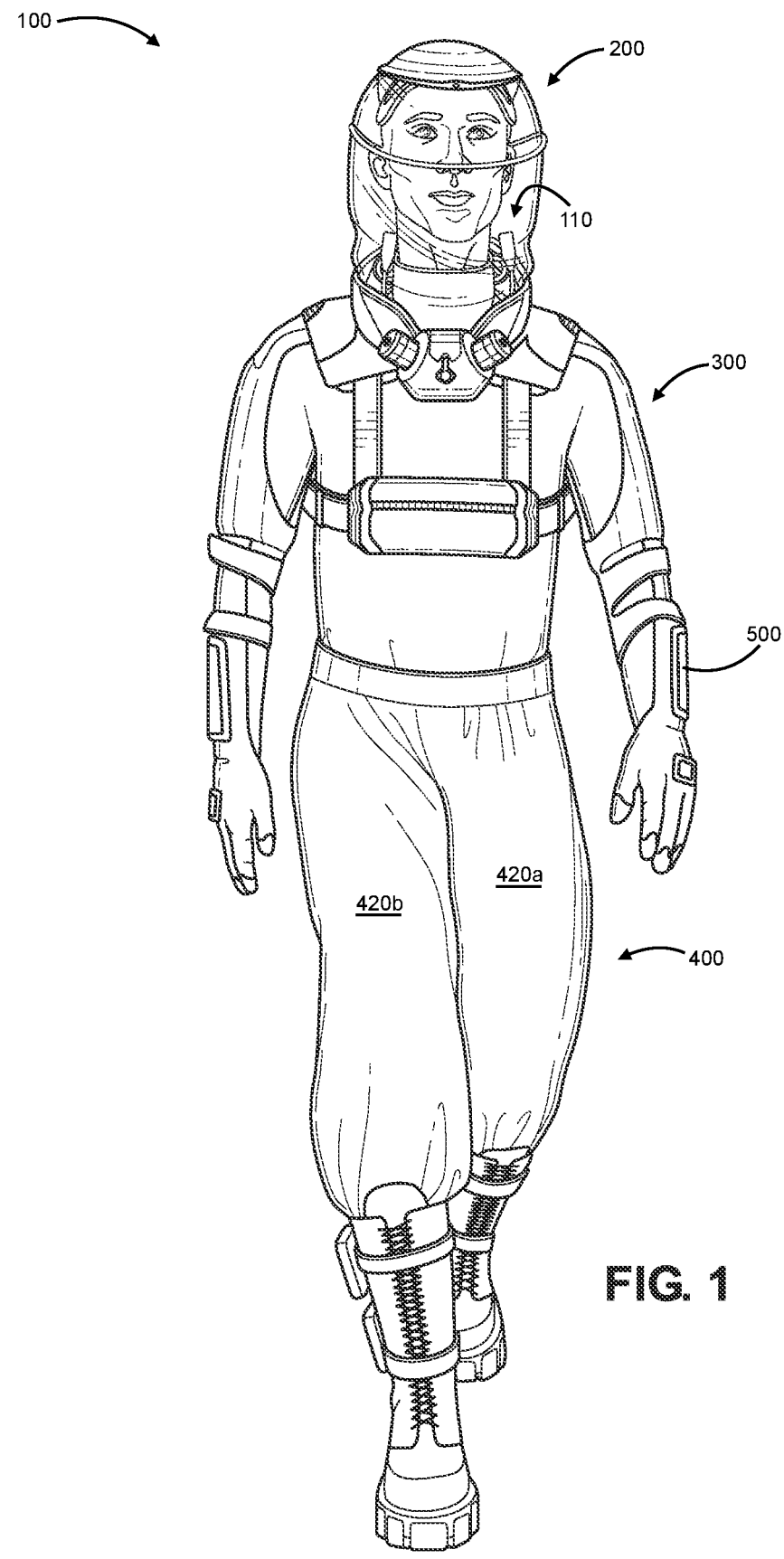
FIG. 1 shows a front view of an embodiment of the sterile body suit apparatus.

The disclosed embodiments may be better understood by referring to the figures in the attached drawings, as provided below. The attached figures are provided as non-limiting examples for providing an enabling description of the method and system claimed. Attention is called to the fact, however, that the appended drawings illustrate only typical embodiments of this invention and are therefore not to be considered as limiting of its scope. One skilled in the art will understand that the invention may be practiced without some of the details included in order to provide a thorough enabling description of such embodiments. Well-known structures and functions have not been shown or described in detail to avoid unnecessarily obscuring the description of the embodiments.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested. Additionally, while the disclosure will be below, there is no intent to limit it to the embodiment or embodiments disclosed herein. Rather, the intent is to cover all alternatives, modifications and equivalents included within the spirit and scope of the disclosure.

FIG. 1 illustrates one embodiment of a sterile body suit apparatus 100 in accordance with this invention. As shown in FIG. 1, the sterile body suit apparatus 100 may comprise a helmet member 200, an upper extremity member 300, a lower extremity member 400, a control interface means 500, and a power supply. The sterile body suit 100 may be further defined by an interior cavity 110. The sterile body suit 100 may be formed out of airtight, sterile material. Along these lines, the sterile body suit 100 may be formed of a combination of soft and rigid materials which is durable and capable of easy disinfection. By way of example, the sterile body suit 100 may be formed of ultra-high-molecular-weight polyethylene (UHMWPE). Moreover, in certain embodiments, the sterile body suit 100 may be waterproof, water resistant, or water repellent. In this manner, the body suit 100 may reduce or eliminate the potential spread of airborne contagions, such as the novel coronavirus. As a result, a wearer of the body suit 100 may be able to participate in social gatherings with groups of people.

With attention now to FIG. 2-5, the helmet member 200 may be configured to receive the wearer's head and may be adjustable to fit or one-size-fits-all. The helmet member 200 may be partially defined by the interior cavity 110, which may be sized to the wearer's head at the helmet member 200. Further, the helmet member 200 may be defined by a face portion 220 and a head portion 230. In some embodiments, the face portion 220 may be formed out of a soft material while the head portion 230 may be formed out of a rigid material, or vice versa. Alternatively, the face portion 220 and the head portion 230 may both be formed out of the soft material or the rigid material. In still other embodiments, the face portion 220 and the head portion 230 may be formed out of a combination of soft and rigid materials. The face portion 220 may further comprise a light source to illuminate the wearer's face. As such, the face portion 220 may be formed of a transparent material, such as plastic or glass.

In further embodiments, the face portion 220 may comprise one or more cameras 270 disposed along an exterior surface thereof. The one or more cameras 270 may capture real-time video footage and may provide visibility to the wearer while urinating or otherwise using the restroom facilities. The one or more cameras 270 may also capture photographs and video to be stored locally or through cloud storage. Further, the one or more cameras 270 may also provide proactive security by receive real-time video footage and using artificial intelligence to analyze a perceived level of threat. In turn, the one or more cameras 270 or the control interface means may generate and transmit an emergency notification to an appropriate entity or authority.

According to certain embodiments, the helmet member 200 and/or the upper extremity member 300 may further comprise a respiratory means 240, an ingestion means 250, and an audio communication means 260. The respiratory means 240 may provide uncontaminated, breathable air to the wearer. The respiratory means 240, the ingestion means 250, and the audio communication means 260 may be disposed in the interior cavity of the helmet member. In certain embodiments, the respiratory means 240, the ingestion means 250, and the audio communication means 260 may be disposed within the interior cavity at or near a nose or a mouth of the face portion.

Figure 3:
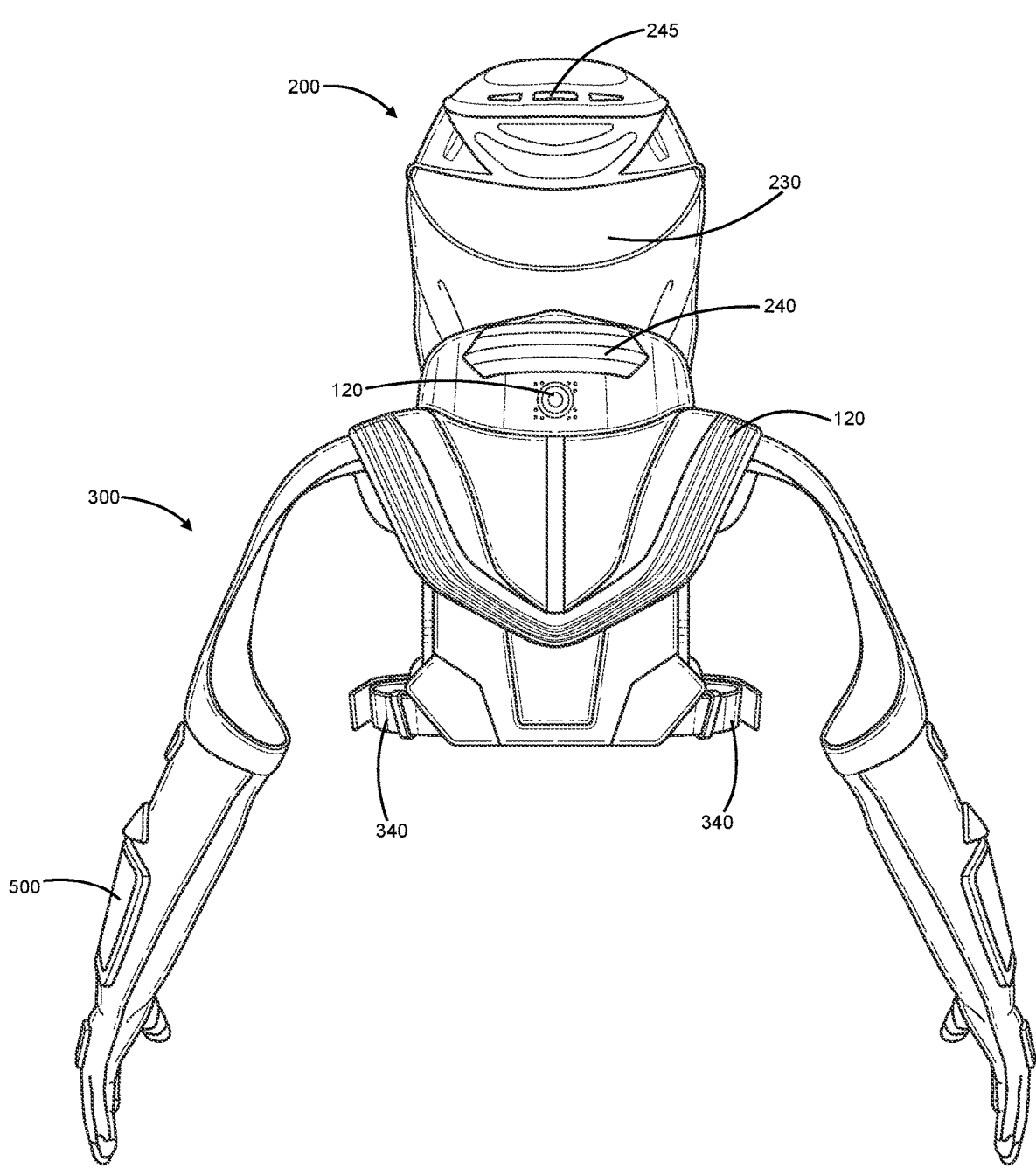
FIG. 3 shows a rear view of an embodiment of the sterile body suit apparatus.
Figure 4:
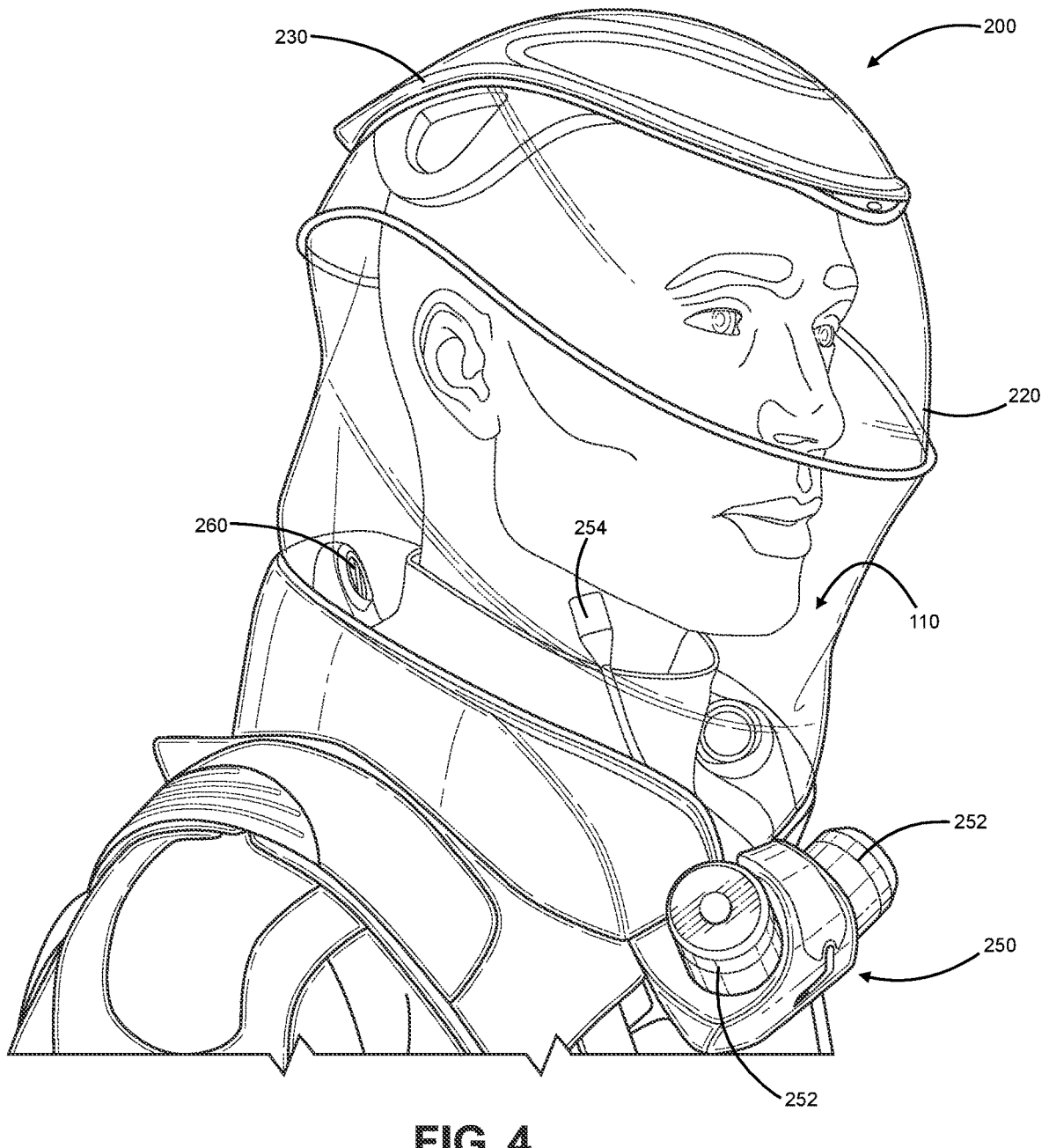
FIG. 4 shows a perspective view of an embodiment of the sterile body suit apparatus.

With particular attention to FIG. 3, the respiratory means 240 may comprise any known respiratory means. In some embodiments, the respiratory means 240 may comprise a respiratory or a self-contained breathing apparatus. In some embodiments, the respiratory means 240 may comprise an N95 particulate filter and suction system. In alternate embodiments, the respiratory means 240 may comprise an N99 class particulate filter and suction system and an air ejection system. In such embodiments, air from the environment may be suctioned through a rear vent, which may pass through the N99 filter or the N95 filter, as the case may be, and one or more clean air distributors, which freshen the air and ultimately, direct the air toward the user for inhalation. Subsequently, exhaled air may be filtered through one or more ejection vents 245 disposed at or near the top of the helmet member 200.

Figure 5:
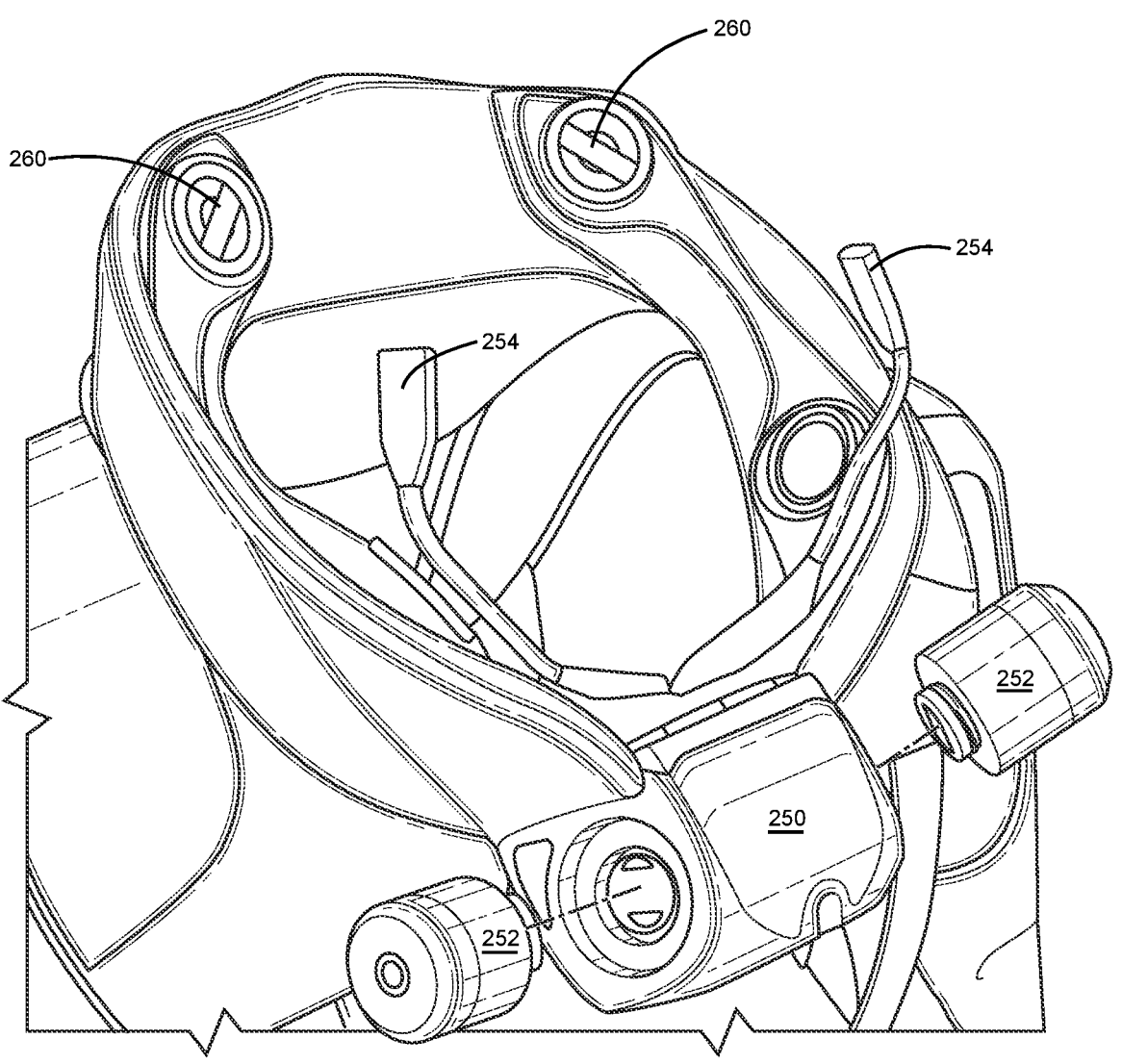
FIG. 5 shows a perspective view of an embodiment of the sterile body suit apparatus.

With particular attention now to FIG. 5, the ingestion means 250 may allow the wearer to drink, eat, and vape while wearing the sterile body suit 100. The ingestion means 250 may reduce the potential for external agents, such as undesired drugs, to be administered in the wearer's food or beverage item. In certain embodiments, the ingestion means 250 may comprise one or more self-contained canisters 252 through which a beverage, such as an alcoholic beverage, a non-alcoholic beverage, or liquid meal replacement, a food item, or vapor, as desired, may pass to and be received by the wearer. For example, the one or more canister 252 may have a carbon filter for vaping.

The one or more canisters 252 may comprise pre-made beverages so as to mitigate or eliminate long lines at a bar or restaurant. In addition, the one or more canisters 252 may remove the possibility of contamination or exposure to external agents, such as harmful drugs, of food or beverage items. Moreover, the one or more canisters 252 may be partially disposable. In some embodiments, the ingestion means 250 may also comprise one or more supply nozzles 254 through which contents of the one or more canisters 252 may be supplied to the wearer. In additional embodiments, the one or more canisters 252 may comprise a monitoring means for detecting a remaining amount of beverage, food, or vape in the one or more canisters 252.

As shown in FIG. 5, the one or more canisters 252 may also comprise a snap system where the one or more canisters 252 may comprise one or more snaps which may secure into a magnetic canister slot disposed within the body suit 100. The one or more canisters 252 may also comprise an identification means, which may comprise product codes, iconography, a barcode, or other color or iconic convention to assist the wearer in their selections. The snap system may prevent spillage of the beverage or food item from the or more canisters 252. In certain embodiments, the ingestion means 250 may further comprise a scratching means, which may comprise a pole configured to touch various parts of the wearer's face and relieve any discomfort, such as an itch or sweat droplet.

The audio communication means 260 may comprise one or more speakers and one or more microphones. The one or more speakers may emit audio data to the wearer and/or an environment and the one or more microphones may receive audio data from the wearer. In this manner, the audio communication means 260 may allow the wearer to socialize, listen to music, or listen to or communicate other audio data. The wearer may be able to define rules for social interaction such that the audio communication means 260 may selectively receive and transmit audio data and voice data. For instance, the audio communication means 260 may allow all audio data to be received or only certain audio data (i.e., from particular individuals) to be received.

In certain embodiments, the audio communication means 260 may receive and transmit audio data over Bluetooth, a local area network (LAN), such as WiFi, cellular, near-field communication (NFC), radio-frequency identification (RFID), infrared, a radio, a global positioning system (GPS) combined with LAN or a wireless access network (WAN), or a mesh network. The audio communication means 260 may receive and transmit audio data using any other audio communication means known to those skilled in the art.

Figure 2:
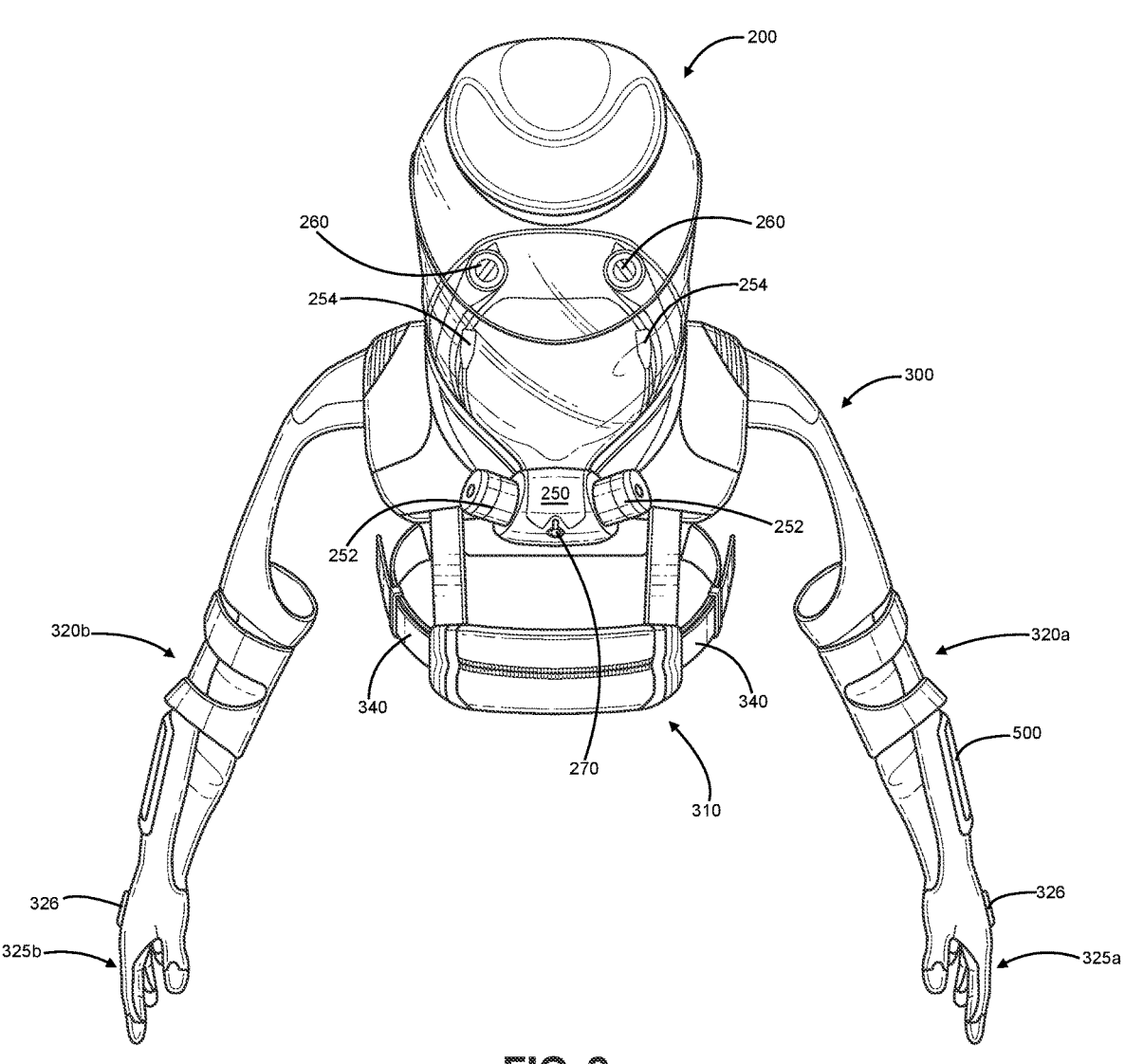
FIG. 2 shows a front view of an embodiment of the sterile body suit apparatus.
Figure 6:
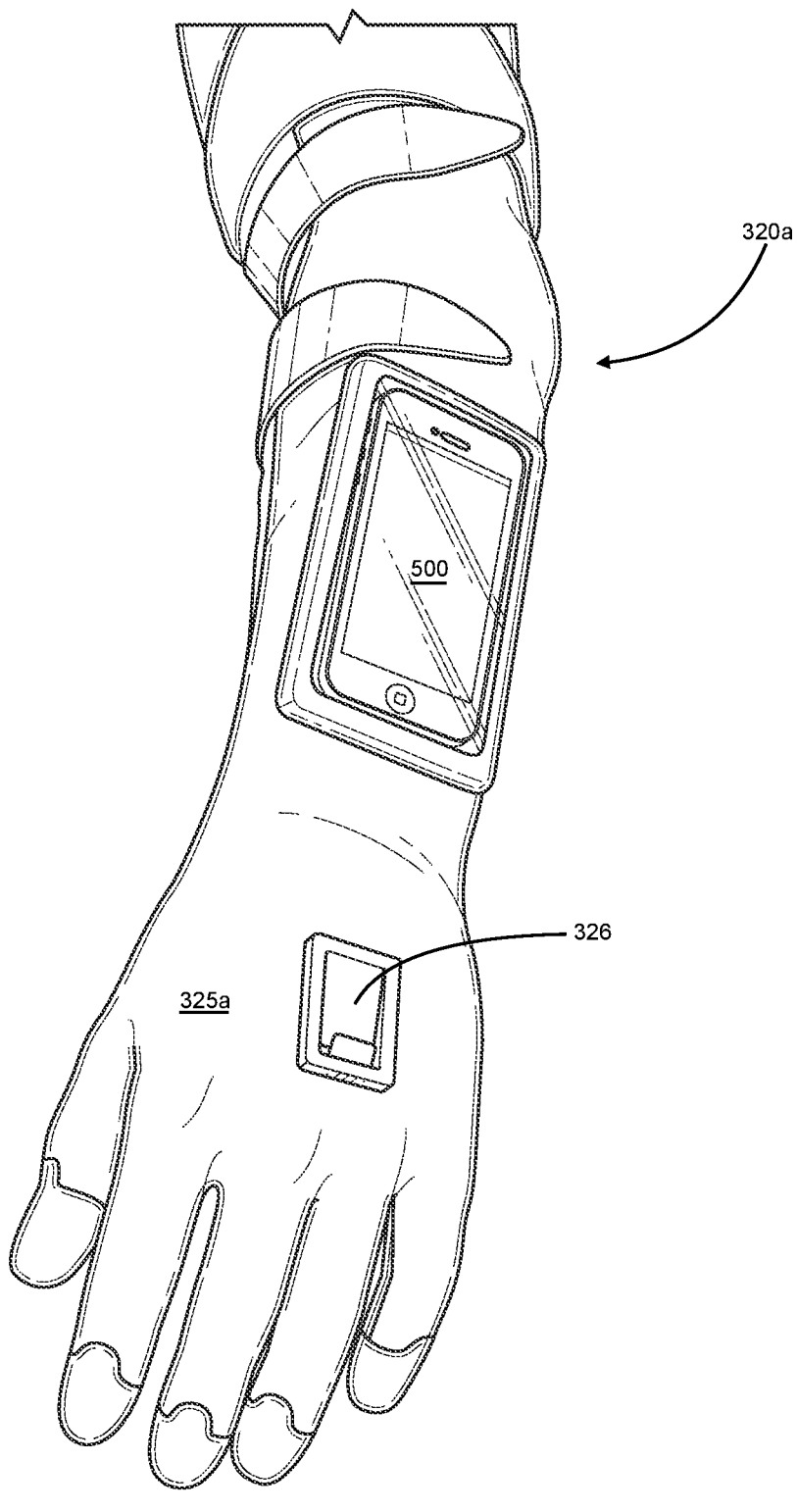
FIG. 6 shows a perspective view of an embodiment of the sterile body suit apparatus.

With attention now to FIGS. 2-3 and 6, the upper extremity member 300 may be defined by a torso 310, a first arm 320*a*, and a second arm 320*b*. As with the helmet member 200, the upper extremity member 300 may be adjustable to fit or one-size-fits all. Moreover, in some embodiments, each of the torso 310, the first arm 320*a*, and the second arm 320*b* may be adjustable to fit. In such embodiments, the upper extremity member 300, or one or more of the torso 310, the first arm 320*a*, and the second arm 320*b* may comprise one or more adjustable straps 340. The one or more adjustable straps 340 may allow the body suit to fit a variety of wearers.

FIG. 6 shows the first arm 320*a* in greater detail. It will be understood that while FIG. 6 is described as showing the first arm 320*a*, the following description may also apply with equal force to the second arm 320*b*. In this embodiment, the control interface means 500 may be disposed along one or more of the second arm 320*a* or the first arm 320*b*. The first arm 320*a* may comprise a first hand 325*a* and the second arm 320*b* may comprise a second hand 325*b*. Each of the first hand 325*a* and the second hand 325*b* may provide sufficient range of motion so as to allow the wearer dexterity and the ability to gesture, and interact with the control interface means 500. Each of the first hand 325*a* and the second hand 325*b* may provide non-slip grip so as to allow the wearer to grip and handle objects. Moreover, the first hand 325*a* and the second hand 325*b*, or a portion thereof, may be formed of a material that allows the wearer to interact with a touchscreen. To that end, the first hand 325*a* and the second hand 325*b* may be formed of conductive threads, such as silver or copper.

In further embodiments, the first hand 325*a* and the second hand 325*b* may comprise one or more latches 326, which may aid in dressing and undressing as well as lock the first arm 320*a* and the second arm 320*b* to the upper extremity member 300. For instance, the one or more latches 326 may comprise magnetic pull latches affixed atop the first hand 325*a* and the second hand 325*b*.

According to certain embodiments, the helmet member 200 and the upper extremity member 300 may comprise a single-bodied sterile body suit apparatus. In these embodiments, the helmet member 200 may be contiguously joined to the upper extremity member 300. In other embodiments, the helmet member 200 may be separate but securable to the upper extremity member 300. Further, the helmet member 200 may secure to the upper extremity member 300 so as to form an airtight seal.

The control interface means 500 may control all aspects of the wearer's experience in the sterile body suit 100. As one example, the control interface means 500 may allow the wearer to remove the body suit 100. As another example, the control interface means 500 may selectively receive audio data and adjust the volume within the interior cavity 110 of the body suit 100. The control interface means 500 may further adjust the volume within the interior cavity 110 depending on the source of the audio data (i.e., ambient noise, friend, DJ). The control interface means 500 may also control the ingestion means 250. Moreover, the control interface means 500 may allow the wearer to signal to the environment's staff that the wearer desires a beverage or food item. Further, the control interface means 500 may provide troubleshooting for the body suit 100.

In accordance with some embodiments, the control interface means 500 may comprise a mobile computing device. The mobile computing device may be associated with the wearer in that the control interface means 500 may comprise a software application stored on the wearer's mobile computing device. As shown in FIG. 6, the mobile computing device may be disposed in a cell link pouch, which may have both data and power capabilities. In alternate embodiments, the control interface means 500 may be associated with the environment within which the wearer is social gathering. In further embodiments, the control interface means 500 may comprise a body suit interface device that is disposed along the body suit 100. The body suit interface device may be disposed along one or more of the helmet member 200, the upper extremity member 300 or, in some embodiments, the lower extremity member 400. In some embodiments, the body suit interface device may be disposed along a wrist portion of the first arm 320*a* or the second arm 320*b*.

In further embodiments, including as shown in FIG. 1, the sterile body suit apparatus 100 may comprise a lower extremity member 400, which may correspond to the wearer's lower extremities. The lower extremity member 400 may comprise a first leg 420*a* and a second leg 420*b*. In other embodiments (not shown), the lower extremity member 400 may be formed of a single leg, similar to the appearance of a long skirt. In addition, the lower extremity member 400 may be contiguously joined to the upper extremity member 300. Alternatively, the lower extremity member 400 may be separate but securable to the upper extremity member 300. In some embodiments, the lower extremity member 400 may secure to the upper extremity member 300 so as to form an airtight seal.

In certain embodiments where in the body suit apparatus 100 comprises the lower extremity member 400, the lower extremity member 400 may further comprise an egestion means. The egestion means may remove one or more egestion outputs, such as bodily waste associated with urination, defecation, and regurgitation, from the wearer. For example, in some embodiments, the egestion means may comprise a space toilet. Moreover, the egestion means may instead comprise one or more components of a space toilet, such as a liquid/solid waste tube and a liquid/solid waste chamber.

Further, the sterile body suit apparatus 100 may comprise a power supply. The power supply may comprise a power cord, one or more batteries, or other means of supplying electrical power to the body suit 100. In embodiments where the power supply may comprise the power cord, the body suit 100 may therefore be rechargeable. Alternatively, in embodiments where the power supply may comprise the one or more batteries, the one or more batteries may comprise one or more lithium-ion cell battery systems. Such systems may permit uninterrupted active operation of the body suit 100. Additionally, the one or more lithium-ion cell battery systems may be easy to charge and replaced when discharged.

In some embodiments, the sterile body suit 100 may also comprise a temperature control means. The temperature control means may regulate the temperature and climate within the interior cavity 110 of the body suit. In this way, the temperature control means may maintain a comfortable environment for the wearer within the body suit 100. The temperature control means may comprise one or more vents or a ventilation system. The one or more vents or the ventilation system may circulate air within the interior cavity 110 and evaporate the wearer's sweat. Moreover, the one or more vents or the ventilation system may reduce humidity within the interior cavity 110. According to some embodiments, the temperature control means may comprise air-purifying filters so as to avoid contamination of the interior cavity 110 and the wearer. In further embodiments, the temperature control means may comprise a cooling undergarment. The temperature control means may be controlled and operated via the control interface means 500.

The sterile body suit 100 may also comprise a tactile sensation means. The tactile sensation means may allow the wearer to sense touch and pressure applied to the body suit 100. The tactile sensation means may use haptic feedback, electromuscular stimulation, or transcutaneous electrical neural stimulation. By way of further example, the tactile sensation means may implement a tactile audio system, such as that described in U.S. Patent Application Publication No. 20190082267, incorporated herein by reference. In such embodiments, the tactile sensation means may use haptic feedback through sensors on the wearer's skin, interoception through subtle changes in force and pressure, and bone conduction through vibrations pulsed through bones.

Finally, the sterile body suit apparatus 100 may comprise one or more design elements 120. The one or more design elements 120 may comprise a flange, a stripe, a line, a shape, or a pattern disposed along the exterior surface of the body suit 100. A person of ordinary skill in the art will recognize virtually any design elements may be applied to the body suit. In some embodiments, such as that shown in the FIGS., the one or more design elements 120 may comprise one or more dynamic design elements. The one or more dynamic design elements may comprise one or more LED neon flex strips, chemiluminescence devices, or RGB LED strips. In such embodiments, the one or more dynamic design elements may be dimmable. The one or more design elements 120 may comprise other types of design elements, whether dynamic or not. The one or more design elements 120 may represent the wearer's emotions, needs (such as thirst), or sexual availability. The one or more design elements 120 may be customizable and more particularly, may be customized or controlled via the control interface means.

Certain examples of possible embodiments comprising the sterile body suit apparatus 100 have been provided above. However, it is to be understood that any body suit which protects the wearer from airborne contagions, such as the coronavirus, while allowing the wearer to engage in in-person socialization is sufficient to practice the invention.

Figure 7:
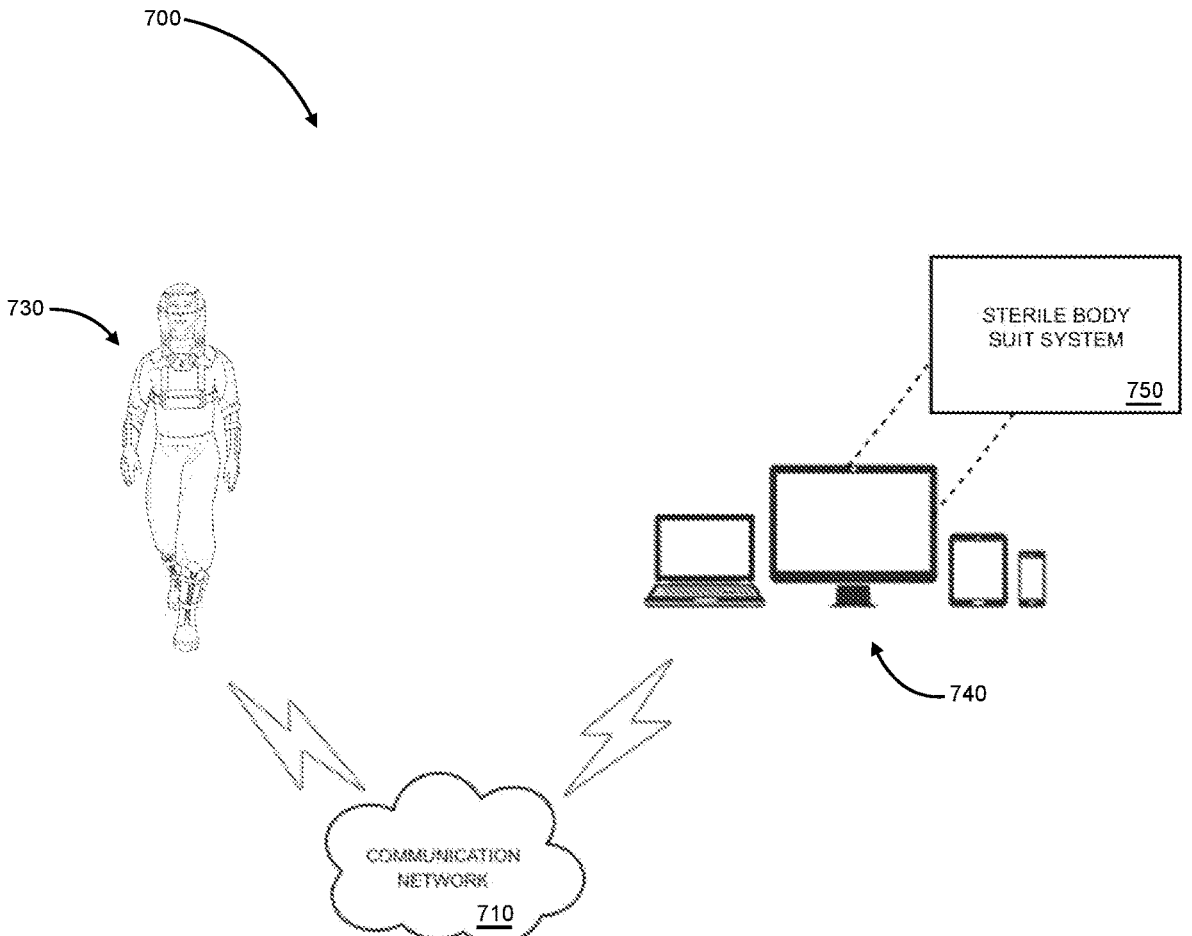
FIG. 7 shows an embodiment of the sterile body suit system.

FIG. 7 is illustrative of a networked environment 700 in which an exemplary embodiment of a sterile body suit system is implemented. As shown in FIG. 7, the sterile body suit system 750 may comprise one or more sterile body suits 730 and one or more mobile computing devices 740. In further systems, one or more housing pods may also be provided.

By way of example and not limitation, the one or more sterile body suits 730 and the one or more mobile computing devices 740 may be coupled via a communication network 710. The one or more sterile body suits 730 may comprise the sterile body suit apparatus, described previously, or other sterile body suits recognizable to those of ordinary skill in the art. The one or more mobile computing devices 740 may be embodied as any mobile computing device, such as, for example and without limitation, a smartphone that incorporates cellular telephone functionality. Notably, the communications network 710 may use one or more of various types of communications, such as cellular and Wi-Fi communications. Additionally, a server may implement the sterile body suit system. Specifically, the server may implement the steps outlined in FIG. 10.

If embodied in software, it should be noted that each block depicted in the accompanying flowchart of FIG. 10 may represent a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as the one or more sterile body suits 730 or the one or more mobile computing devices 740. The machine code may be converted from the source code, etc. If embodied in hardware, each block may represent a circuit or a number of interconnected circuits to implement the specified logical functions. Additionally, although the flowchart shows specific orders of execution, it is to be understood that the orders of execution may differ.

Primarily, the one or more sterile body suits 730 may be operative to protect the one or more wearers from one or more hazards in an environment. In this manner, the one or more sterile body suits 730 may provide an airtight barrier between the one or more wearers and the environment. As previously discussed, the environment may comprise any location where more than two individuals may gather. For example, the environment may comprise a nightclub, a bar, a restaurant, a theater, an area, a field, a retail store, a fitness studio, or a park. The one or more hazards may comprise one or more biological agents, one or more chemical agents, one or more nuclear agents, or one or more high temperature/fire agents. The one or more biological agents may further comprise a virus, a bacteria, or any other undesirable contagion, airborne or otherwise. By way of example, in certain embodiments, the one or more biological agents may comprise the novel coronavirus.

Additionally, the one or more body suits 730 may be operative to provide a respiratory means to the one or more wearers. The respiratory means may provide uncontaminated, breathable air to the one or more wearers. In some embodiments, the respiratory means may purify the air. The respiratory means may comprise a respiratory, a self-contained breathing apparatus, or any other respiratory means.

The one or more sterile body suits 730 may also be operative to receive audio data from other wearers of the one or more wearers and the environment. In turn, the one or more sterile body suits 730 may be operative to transmit the audio data to the one or more wearers. According to some embodiments, the one or more sterile body suits 730 may be operative to selectively transmit the audio data to the one or more wearers. Further, the one or more body suits 730 may be operative to adjust the volume of the audio data. Along these lines, the one or more body suits 730 may be operative to transmit voice data between the one or more wearers. In some embodiments, the body suits 730 may be operative to selectively transmit the voice data where, in others, the body suits 730 may be operative to automatically transmit the voice data. Further, the body suits 730 may be operative to allow the wearer to modify the voice data, such as through pitch modulation, a vocoder, an octaver, a talkbox, or other voice modification means.

In accordance with certain embodiments, the one or more body suits 730 may be further operative to receive one or more ingestion inputs and transmit the one or more ingestion inputs to the one or more wearers. The one or more ingestion inputs may comprise a beverage, a food item, or vapor (from vaping). The one or more body suits 730 may be operative to receive and transmit the one or more ingestion units while maintaining a sterile personal environment within an interior cavity of the body suits. A person of ordinary skill in the art will understand numerous other ingestion inputs may be received and transmitted, such as smoke (from smoking).

The one or more sterile body suits 730 may be operative to receive a suit selection from the one or more wearers. Then, the one or more body suits 730 may be operative to transmit a suit selection notification to the environment. As discussed previously, the suit selection may depend on the size, shape, or preferences of the one or more wearers. For instance, some of the one or more wearers may prefer a tightly-fitted body suit whereas others may prefer a loosely-fitted body suit. The environment may then be able to sterilize and otherwise prepare the one or more body suits for the one or more wearers.

In some further embodiments, the one or more body suits 730 may be operative to evacuate one or more egestion outputs from the one or more wearers. The one or more egestion outputs may comprise any bodily waste, including that associated with urination, defecation, and regurgitation. The one or more egestion outputs may be evacuated via a space toilet or one or more components thereof.

In accordance with other embodiments of the present invention, the one or more sterile body suits 730 may be operative to provide tactile sensation to the wearer. In other words, the one or more body suits 730 may be operative to allow the wearer to sense touch, pressure, and temperature applied to the body suit. The one or more wearers may therefore feel realistically immersed in the environment, despite being separated therefrom by the body suit. To accomplish this, the one or more body suits 730 may implement the above-described tactile sensation means.

Figure 8:
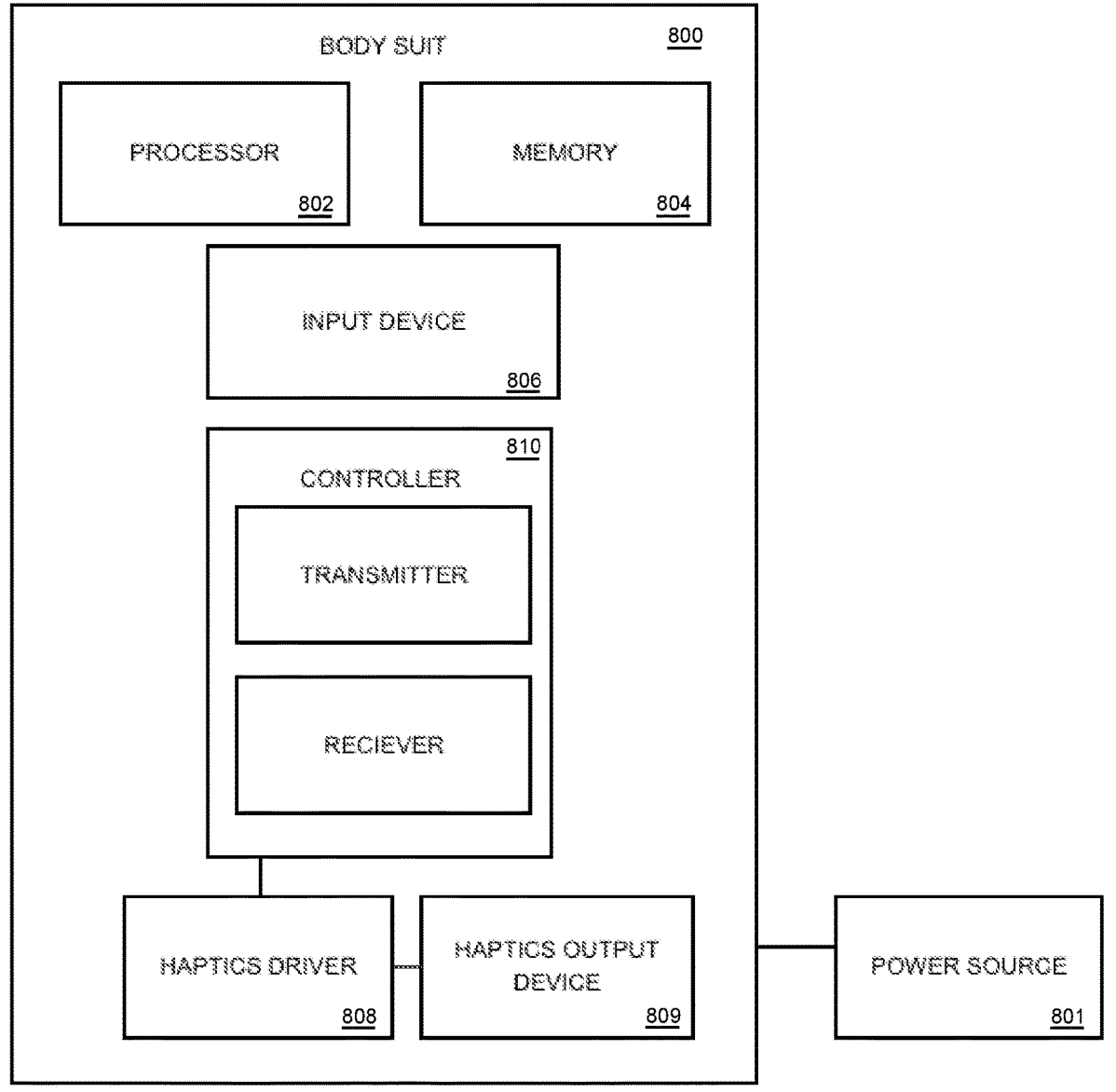
FIG. 8 is a block diagram depicting an exemplary embodiment of the system in accordance with one embodiment of this invention.

FIG. 8 illustrates an exemplary body suit 800 configured to implement the sterile body suit system shown in FIG. 7. The body suit 800 may comprise the body suit apparatus as previously described but may also be embodied in any one of a wide variety of wired and/or wireless sterile body suits. As shown in FIG. 8, the body suit 800 may include a processing device (processor) 802, a memory 804, input devices 806, a controller 810 having a transmitter and receiver, a haptics driver 808, and a haptics output device 809. Additionally, body suit 800 may be electronically coupled to a power source 801. The processor 802 may include any commercially made or commercially available processor, such as those discussed below. Moreover, the memory 804 may include any one of a combination of volatile memory elements and nonvolatile memory elements, such as those discussed below.

The processing device 802 may include any custom made or commercially available processor, a central processing unit (CPU) or an auxiliary processor among several processors associated with the body suit 800, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 804 can include any one of a combination of volatile memory elements (e.g., random-access memory (RAM, such as DRAM, and SRAM, etc.)) and nonvolatile memory elements. The memory typically comprises native operating system, one or more native applications, emulation systems, or emulated applications for any of a variety of operating systems and/or emulated hardware platforms, emulated operating systems, etc. For example, the applications may include application specific software which may comprise some or all the components of the body suit 800. In accordance with such embodiments, the components are stored in memory and executed by the processing device. Note that the sterile body suit system and method may be resident in memory such as memory 804. One of ordinary skill in the art will appreciate that the memory 804 can, and typically will, comprise other components which have been omitted for purposes of brevity. Note that in the context of this disclosure, a non-transitory computer-readable medium stores one or more programs for use by or in connection with an instruction execution system, apparatus, or device.

With attention back to FIG. 7, the one or more mobile computing devices 740 may be operative to control one or more functionalities of the one or more body suits. The one or more functionalities may comprise temperature regulation, volume regulation, one or more ingestion input regulation, and one or more design element customization. For instance, the one or more body suits 730 may be operative to ventilate and purify air within the air cavity, thereby regulating temperature therein. In embodiments where the one or more functionalities may comprise volume regulation, the one or more wearers may reduce or remove audio data within the interior cavity altogether. Moreover, the one or more wearers may reduce or remove audio data within the interior cavity depending on the source thereof (DJ, ambient noise, friend, etc.). As a final example, the one or more body suits 730 may be operative to customize and dynamically update the one or more design elements on the exterior surface of the body suit. For instance, the one or more design elements may be dimmed or brightened.

Figure 9:
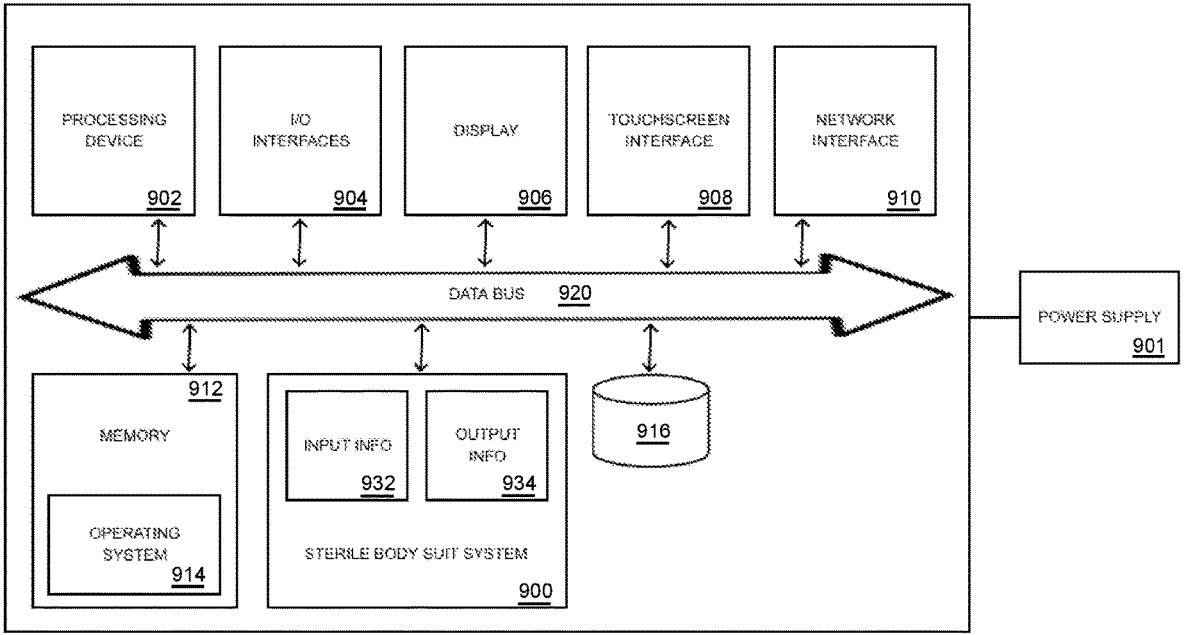
FIG. 9 is a block diagram depicting an exemplary embodiment of the system in accordance with one embodiment of this invention.

FIG. 9 illustrates the mobile computing device 740 shown in FIG. 7. As described earlier, mobile computing device 740 may be a desktop computer, smartphone, laptop, or even tablet computer but may also be embodied in any one of a wide variety of wired and/or wireless computing devices known to those skilled in the art. As shown in FIG. 9, the computing device 740 may include a processing device (processor) 902, input/output interfaces 904, a display 906, a touchscreen interface 908, a network interface 910, a memory 912, and operating system 914, a mass storage 916, with each communicating across a local data bus 920. Additionally, computing device 740 may incorporate a sterile body suit system 900, which is depicted as including input information 932 and output information 934, although the location of information 932, 934 may vary. The mobile computing device may further comprise a power supply 901.

The processing device 902 may include any custom made or commercially available processor, a central processing unit (CPU) or an auxiliary processor among several processors associated with the computing device 740, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 912 may include any one of a combination of volatile memory elements (e.g., random-access memory (RAM, such as DRAM, and SRAM, etc.)) and nonvolatile memory elements. The memory typically comprises native operating system 914, one or more native applications, emulation systems, or emulated applications for any of a variety of operating systems and/or emulated hardware platforms, emulated operating systems, etc. For example, the applications may include application specific software which may comprise some or all the components of the computing device 740. In accordance with such embodiments, the components are stored in memory and executed by the processing device. Note that although depicted separately in FIG. 9, the sterile body suit system and method 900 may be resident in memory such as memory 912.

Touchscreen interface 908 is configured to detect contact within the display area of the display 906 and provides such functionality as on-screen buttons, menus, keyboards, etc. that allows users to navigate user interfaces by touch. For instance, touchscreen interface 908 may allow users to regulate the temperature of the interior cavity, regulate the volume of the audio data, and customize the one or more design elements, thereby further allowing users to input the order. For some embodiments, the one or more mobile computing devices 740 or the control means may comprise GPS or other means to determine the location thereof.

One of ordinary skill in the art will appreciate that the memory 912 may, and typically will, comprise other components which have been omitted for purposes of brevity. Note that in the context of this disclosure, a non-transitory computer-readable medium stores one or more programs for use by or in connection with an instruction execution system, apparatus, or method. Network interface 910 may comprise various components used to transmit and/or receive data over a networked environment. When such components are embodied as an application, the one or more components may be stored on a non-transitory computer-readable medium and executed by the processing device.

In certain embodiments, the sterile body suit system may comprise the one or more housing pods. The one or more housing pods may be operative to house the one or more sterile body suits. Also, the one or more housing pods may be operative to sterilize the one or more body suits. The one or more housing pods may sterilize the one or more body suits using UV sterilization, chemical sterilization, or other sterilization means. The one or more housing pods may be further operative to receive the suit selection notification from the one or more mobile computing devices. In turn, the one or more housing pods may be operative to deliver the one or more body suits to the one or more wearers.

FIG. 10 is a flowchart depicting an exemplary embodiment of a sterile body suit system and method, such as may be performed by the one or more body suits 730 and the one or more mobile computing devices 740. In one embodiment of the present invention, a method involving the aforementioned sterile body suit or one or more sterile body suits may be used to allow for in-person, social gatherings while avoiding the risk of individual contamination. As shown in FIG. 10, the method may comprise the steps of: providing one or more mobile computing devices (block 1001); providing one or more body suits at an environment having a local computing device (block 1002); receiving, at the one or more mobile computing devices, a suit selection (block 1003); generating and transmitting, at the one or more mobile computing devices, a suit selection notification (block 1004); receiving, at the local computing device, the suit selection notification (block 1005); and preparing and delivering, at the environment, the one or more body suits to one or more wearers (block 1006).

First, the one or more mobile computing devices may be provided (block 1001). Providing one or more mobile computing devices (block 1001) may comprise providing the one or more mobile computing devices to the one or more wearers in the environment, such as a nightclub, bar, restaurant, theater, or arena. In such embodiments, the one or more mobile computing device may be associated with the environment. Notably, in such embodiments, the one or more mobile computing devices, may be separate from the local computing device associated with and operated exclusively by the environment. In other embodiments, providing the one or more mobile computing devices (block 1001) may comprise the one or more wearers bringing mobile computing devices to the environment. In these embodiments, the one or more mobile computing devices (block 1001) may be associated with the one or more wearers.

Next, the suit selection may be received at the one or more mobile computing devices (block 1003). Indeed, the one or more wearers may select a particular body suit of the one or more body suits to fulfill their needs. According to some embodiments, such as where the one or more body suits may be available in a variety of shapes and sizes, the one or more wearers may select the one or more body suits based thereon. The one or more mobile computing devices may then generate and transmit the suit selection notification (block 1004).

The suit selection notification may then be received at the local computing device (block 1005). Finally, the one or more body suits may be prepared and delivered to the one or more wearers (block 1006). Preparing the one or more body suits (block 1006) may comprise sterilizing the one or more body suits, such as through UV sterilization, chemical sterilization, or other sterilization means. Delivering the one or more body suits to the one or more wearers (block 1006) may comprise granting the one or more wearers access to the one or more body suits. Alternatively, delivering the one or more body suits (block 1006) may comprise physically presenting the one or more wearers with the one or more body suits.

FIG. 11 is a flowchart depicting a further embodiment of a sterile body suit system and method, which may be performed by the one or more body suits 730 and the one or more mobile computing devices 740. As shown in FIG. 11, the method may also comprise the steps of: protecting, at the one or more body suits, the one or more wearers from one or more hazards in the environment (block 1101); receiving, at the one or more body suits, audio data from one or more other wearers and the environment (block 1102); transmitting, at the one or more body suits, the audio data to the wearer (block 1103); transmitting, at the one or more body suits, voice data between the one or more other wearers (block 1104); receiving, at the one or more body suits, one or more ingestion inputs (block 1105); and transmitting, at the one or more body suits, the one or more ingestion inputs to the one or more wearers (block 1106).

Lastly, the sterile body suit method may further comprise the steps of: providing one or more housing pods at the environment, the one or more housing pods associated with the one or more body suits; receiving, at the one or more housing pods, the suit selection notification; and preparing and delivering, at the one or more housing pods, the one or more body suits. In these embodiments, preparing and delivering the one or more body suits may further comprise sterilizing the one or more body suits and the wearer.

If embodied in software, it should be noted that each step in the described method and each function or operation of the described system and apparatus represents a module, segment, or portion of code that comprises program instructions stored on a non-transitory computer readable medium to implement the specified logical functions. In this regard, the program instructions may be embodied in the form of source code that comprises statements written in a programming language or machine code that comprises numerical instructions recognizable by a suitable execution system such as the control interface means and the one or more mobile computing devices. The machine code may be converted from the source code, etc. If embodied in hardware, each step in the method and each function or operation of the system and apparatus may represent a circuit or a number of interconnected circuits to implement the specified logical functions. Additionally, although the method discloses specific orders of execution, it is to be understood that the orders of execution may differ.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. Accordingly, it is intended that the invention not be limited.

The teachings disclosed herein may be applied to other apparatuses, systems, and methods and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the sterile body suit apparatus, system, and method with which that terminology is associated. In general, the terms used in the following claims should not be constructed to limit the sterile body suit apparatus, system, and method to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the sterile body suit apparatus, system, and method is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the sterile body suit apparatus, system, and method.

What is claimed is:

1. A sterile body suit, comprising an upper extremity member defined by a torso portion, a first arm portion, and a second arm portion;

a helmet member, the helmet member having a) a face portion and a head portion defining an interior cavity having an interior surface;

b) a respiratory means comprising a particulate filter, suction system, and air ejection system and configured to draw ambient air through the particulate filter via a rear-facing vent disposed along the interior surface of the helmet member, and an air ejection system configured to discharge exhaled air through one or more vents disposed near a top portion of the helmet member; and c) an ingestion means for drinking, eating, and vaping comprising one or more self-contained cannisters releasably couplable directly to and supported by the face portion of the helmet and in communication with one or more supply nozzles through which the contents of the one or more cannisters are supplied to a wearer; and an audio communication means;

a control interface means; and a power supply;

wherein the sterile body suit is configured to be worn over a user's upper extremities, such that the sterile body suit terminates above the wearer's waist, and leaves the wearer's lower extremities uncovered.

2. The sterile body suit of claim 1, further comprising a temperature control means.

3. The sterile body suit of claim 2, wherein the temperature control means comprises an air-purifying ventilation system.

4. The sterile body suit of claim 1, further comprising a tactile sensation means comprising one or more of haptic actuators, electromuscular stimulators, or transcutaneous electrical neural stimulators operative to actively generate tactile feedback to the wearer corresponding to touch and pressure interactions with the sterile body suit.

5. The sterile body suit of claim 1, wherein the control interface means comprises a body interface device disposed along the helmet member or the upper extremity member, or a mobile computing device.

6. The sterile body suit of claim 5, wherein the body interface device comprises an intelligent assistant operative to provide voice recognition services.

* * * * *